United States Patent
Miyamoto

(10) Patent No.: US 9,449,263 B2
(45) Date of Patent: Sep. 20, 2016

(54) IMAGE PROCESSING APPARATUS, STAMP CREATION APPARATUS, IMAGE PROCESSING METHOD AND RECORDING MEDIUM

(71) Applicant: CASIO COMPUTER CO., LTD, Shibuya-ku (JP)

(72) Inventor: Naotomo Miyamoto, Nerima-ku (JP)

(73) Assignee: CASIO CUMPUTER CO., LTD., Tokyo (JP)

( * ) Notice: Subject to any disclaimer, the term of this patent is extended or adjusted under 35 U.S.C. 154(b) by 19 days.

(21) Appl. No.: 14/455,520

(22) Filed: Aug. 8, 2014

(65) Prior Publication Data

US 2015/0041549 A1    Feb. 12, 2015

(30) Foreign Application Priority Data

Aug. 8, 2013  (JP) .................................. 2013-164896

(51) Int. Cl.
G06K 19/00 (2006.01)
G06K 19/06 (2006.01)

(52) U.S. Cl.
CPC ... G06K 19/06103 (2013.01); G06K 19/06046 (2013.01)

(58) Field of Classification Search
USPC ................................ 235/435, 439, 454, 462
See application file for complete search history.

(56) References Cited

U.S. PATENT DOCUMENTS

| 6,655,579 | B1 * | 12/2003 | Delman et al. ............... 235/375 |
| 8,186,594 | B2 | 5/2012 | Uzawa et al. |
| 2008/0283609 | A1 * | 11/2008 | Nakajima et al. ....... 235/462.07 |

FOREIGN PATENT DOCUMENTS

| JP | 07-237381 | 9/1995 |
| JP | 2007-118316 | 5/2007 |
| JP | 2009-129410 | 6/2009 |
| JP | 2010-140350 | 6/2010 |
| JP | 4777041 | 7/2011 |
| JP | 2011-183808 | 9/2011 |
| JP | 2013-009387 | 1/2013 |

* cited by examiner

Primary Examiner — Matthew Mikels
(74) Attorney, Agent, or Firm — Cozen O'Connor

(57) ABSTRACT

An image processing apparatus includes: a frame image creating unit configured to create a frame image added with code information; and an imprint information generating unit configured to generate imprint information where a mark image for forming an imprint is combined with the frame image.

14 Claims, 5 Drawing Sheets

IMAGE PROCESSING APPARATUS, STAMP CREATION APPARATUS, IMAGE PROCESSING METHOD AND RECORDING MEDIUM

BACKGROUND OF THE INVENTION

1. Technical Field

The present invention relates to an image processing apparatus, a stamp creation apparatus, an image processing method, and a recording medium.

2. Description of the Related Art

Conventionally, there is known an apparatus that generates code information where predetermined information is encoded into a regular arrangement of a set of pixels (U.S. Pat. No. 8,186,594 B2).

Code information is captured, for example, by an imaging apparatus such as a mobile phone or a smartphone, with the code information formed on a recording medium such as paper. The imaging apparatus performs a predetermined decoding process on image information of the captured code information, and thereby obtains original predetermined information represented by the code information.

However, since the code information is a black and white binary encoded image, if the size thereof is small, then information may not be able to be recognized properly, depending on the reading accuracy of a reading apparatus. Hence, the size of code information needs to be increased to some extent, but there is a problem that when such code information is combined with another image, the code information may interfere with another image.

BRIEF SUMMARY OF THE INVENTION

The present invention is made in view of such a problem, and an object of the present invention is to provide an image processing apparatus, a stamp creation apparatus, an image processing method, and a recording medium that can appropriately combine code information with another image without the code information interfering with another image.

According to an embodiment of the present invention, there is provided an image processing apparatus including: a frame image creating unit configured to create a frame image added with code information; and an imprint information generating unit configured to generate imprint information where a mark image for forming an imprint is combined with the frame image.

According to an embodiment of the present invention, there is provided a stamp creation apparatus including: a frame image creating unit configured to create a frame image added with code information; and an imprint information generating unit configured to generate imprint information where a mark image for forming an imprint is combined with the frame image, wherein the stamp creation apparatus creates a stamp, based on the imprint information generated by the imprint information generating unit.

According to an embodiment of the present invention, there is provided an image processing method using an image processing apparatus, the method including the steps of: creating a frame image added with code information; and generating imprint information by combining the created frame image with a mark image for forming an imprint.

According to an embodiment of the present invention, there is provided a non-transitory computer readable recording medium recording a program that causes a computer included in an image processing apparatus to function as: a frame image creating unit configured to create a frame image added with code information; and an imprint information generating unit configured to generate imprint information by combining the frame image created by the frame image creating unit with a mark image for forming an imprint.

DETAILED DESCRIPTION OF THE INVENTION

A specific mode of the present invention will be described below using the drawings. Note, however, that the scope of the invention is not limited to the examples illustrated.

Figure 1:
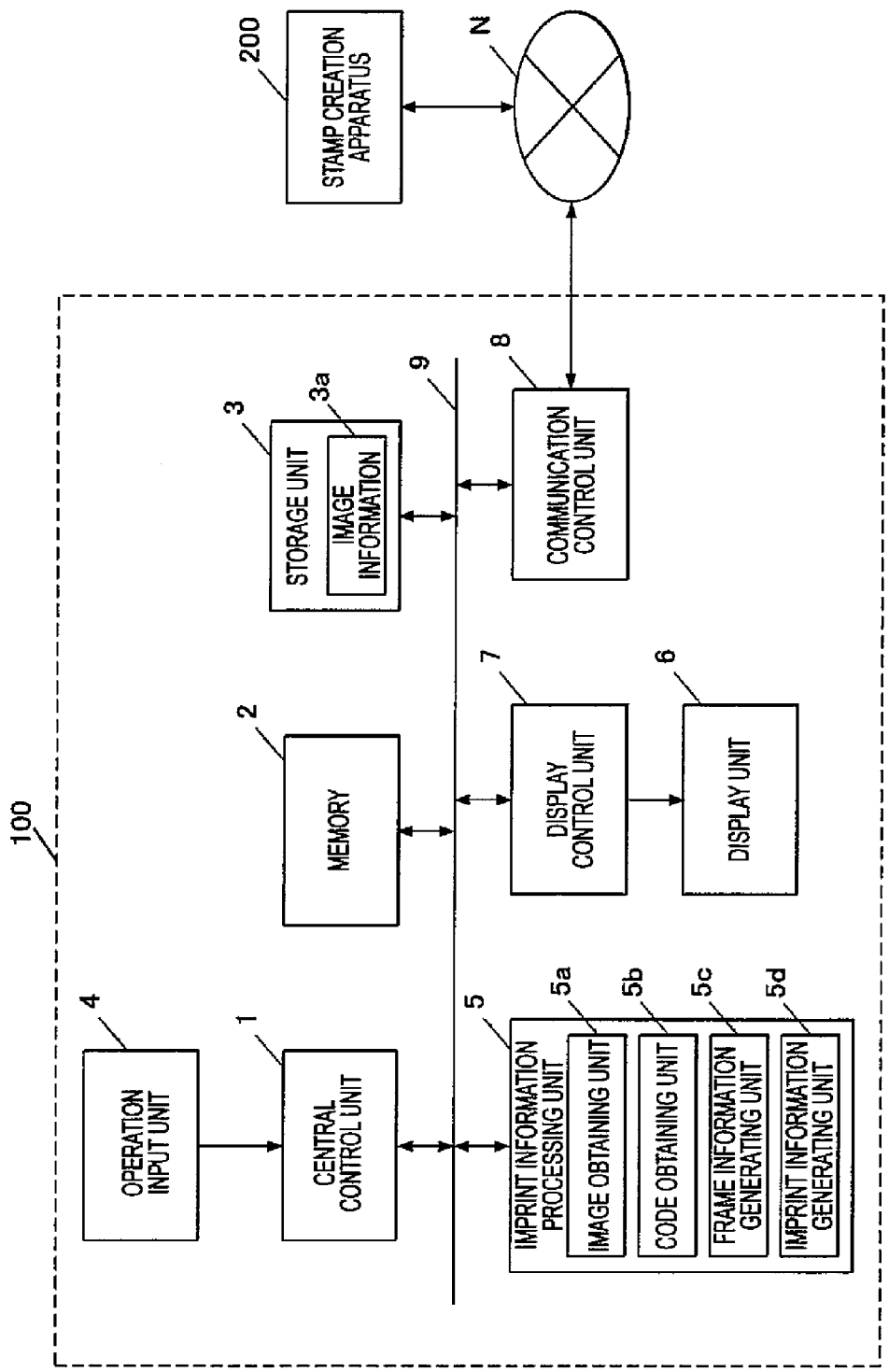
FIG. 1 is a block diagram illustrating a schematic configuration of an image processing apparatus of one embodiment to which the present invention is applied.

FIG. 1 is a block diagram illustrating a schematic configuration of an image processing apparatus 100 of one embodiment to which the present invention is applied.

The image processing apparatus 100 is configured with, for example, a computer such as a personal computer or a workstation, or a computer included in a stamp manufacturing machine. As illustrated in FIG. 1, the image processing apparatus 100 includes a central control unit 1, a memory 2, a storage unit 3, an operation input unit 4, an imprint information processing unit 5, a display unit 6, a display control unit 7, and a communication control unit 8.

In addition, the central control unit 1, the memory 2, the storage unit 3, the imprint information processing unit 5, the display control unit 7, and the communication control unit 8 are connected to each other through a bus line 9.

The central control unit 1 controls each unit of the image processing apparatus 100. Specifically, the central control unit 1 includes a CPU (Central Processing Unit; not illustrated), etc., and performs various types of control operation according to various types of processing programs (not illustrated) for the image processing apparatus 100.

The memory 2 is configured with, for example, DRAM (Dynamic Random Access Memory). The memory 2 includes a buffer memory that temporarily stores data, etc., processed by the central control unit 1, the imprint information processing unit 5, etc.; a working memory of the central control unit 1, etc.; a program memory that stores various types of programs and data related to the functions of the image processing apparatus 100; and the like (none of which are illustrated).

The storage unit 3 is configured with, for example, nonvolatile memory (flash memory), and stores various types of programs and data (not illustrated) required for the operation of the central control unit 1.

In addition, the storage unit 3 stores image information 3a.

Figure 3A:
FIGS. 3A to 3D are diagrams for describing the imprint information generation process of FIG. 2.
Figure 4A:
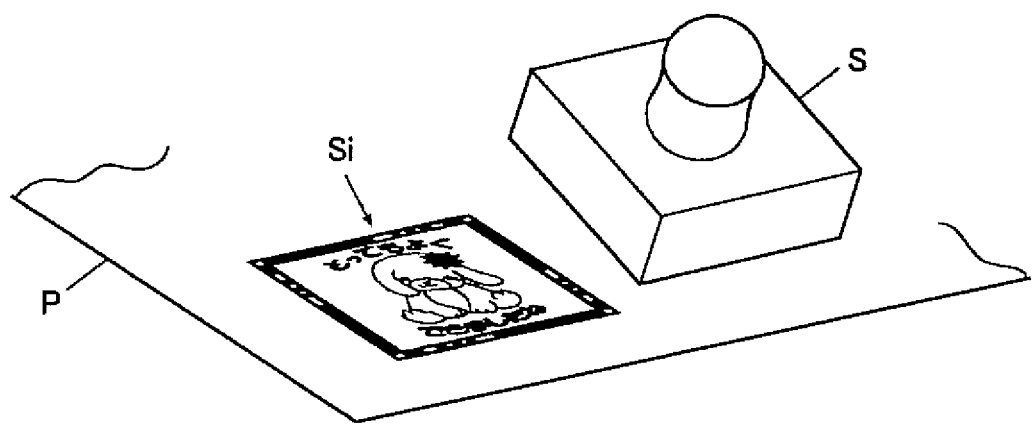
FIGS. 4A and 4B are diagrams schematically illustrating the use state of a stamp created based on imprint information generated by the imprint information generation process of FIG. 2.

The image information 3a is information for a mark image Sp (see FIG. 3A) for forming an imprint Si to be affixed on a recording medium P (see FIG. 4A). The mark image Sp includes, for example, binarized images for various types of characters, letters, graphics, symbols, and photos, but they are examples and thus the mark image Sp is not limited thereto. The mark image Sp may be any image as long as an imprint Si can be formed.

The operation input unit 4 includes, for example, operating units (not illustrated) such as a keyboard configured with, for example, data input keys for inputting numerical values, characters, etc., and up/down/left/right movement keys and various types of function keys for performing selection of data, page up/down operations, etc., and a mouse. The operation input unit 4 outputs predetermined operation signals to the central control unit 1, according to operations performed on the operating units.

The imprint information processing unit 5 includes an image obtaining unit 5a, a code obtaining unit 5b, a frame information generating unit 5c, and an imprint information generating unit 5d.

Note that each unit in the imprint information processing unit 5 is configured with, for example, a predetermined logic circuit, but this configuration is an example and thus is not limited thereto.

The image obtaining unit 5a obtains image information 3a for a mark image Sp.

Namely, the image obtaining unit 5a obtains image information (mark information) 3a for a mark image Sp for forming an imprint Si of a stamp S. Specifically, the image obtaining unit 5a obtains, for example, as mark information, user's desired image information 3a specified based on a user's predetermined operation on the operation input unit 4, from among a predetermined number of pieces of image information 3a stored in the storage unit 3.

Note that the image obtaining unit 5a may obtain image information 3a from an external device (not illustrated) connected thereto through the communication control unit 8.

The code obtaining unit 5b obtains code information Sc.

Namely, the code obtaining unit 5b obtains code information Sc where predetermined information is encoded into a regular arrangement of a set of pixels. Specifically, the code obtaining unit 5b, for example, encodes predetermined information (e.g., a URL) inputted based on a user's predetermined operation on the operation input unit 4, according to a predetermined coding format (e.g., Reed-Solomon coding or Golay coding). By this, the code obtaining unit 5b creates, for example, a black and white binary encoded image where a set of white pixels with the pixel value "1" and a set of black pixels with the pixel value "0" are arranged regularly in a predetermined number of dimensions, and obtains the image as code information Sc.

Here, the predetermined information which is the base of code information Sc includes, for example, a URL for accessing a predetermined server, various types of images, and a predetermined character string, but they are examples and thus the predetermined information is not limited thereto. The predetermined information may be any information as long as the information can be encoded into code information Sc.

Note that a predetermined number of pieces of code information Sc may be stored in advance in a predetermined storage unit (e.g., the storage unit 3), and the code obtaining unit 5b may obtain user's desired code information Sc specified based on a user's predetermined operation on the operation input unit 4, from among the predetermined number of pieces of code information Sc stored in the predetermined storage unit.

The frame information generating unit 5c generates frame information Sf of imprint information Sd.

Namely, the frame information generating unit 5c generates frame information Sf by adding the code information Sc obtained by the code obtaining unit 5b, to a frame W around the mark image Sp. Specifically, the frame information generating unit 5c generates frame information Sf where pieces of code information Sc are added to at least two sides Ws, . . . , respectively, among a plurality of sides Ws, . . . with substantially equal lengths of a polygonal frame W. In addition, the frame information generating unit 5c generates frame information Sf where pieces of code information Sc are added to at least two sides Ws, . . . so as to be symmetric to each other with respect to a predetermined position.

Figure 3B:
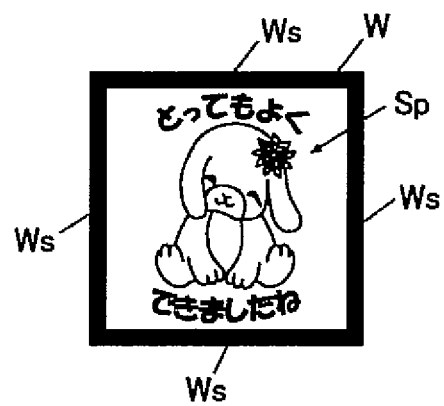
Figure 3C:
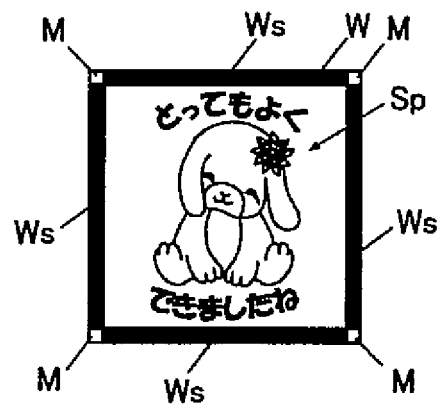
Figure 3D:
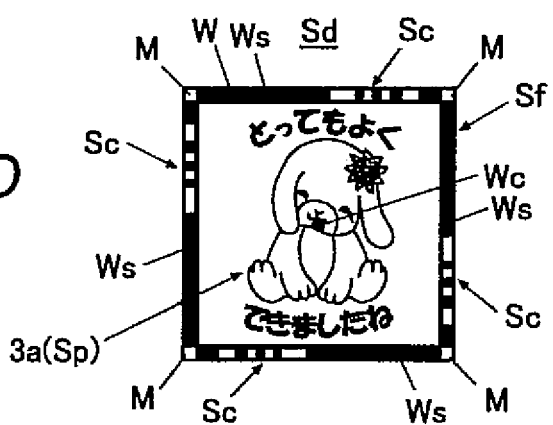

For example, the frame information generating unit 5c generates frame information Sf where pieces of identical code information Sc are added to four sides Ws, . . . of a square frame W, respectively, so as to be point-symmetric to each other with respect to a center Wc of the frame W (see FIG. 3D).

The imprint information generating unit 5d generates imprint information Sd for an imprint Si to be affixed on a recording medium P.

Namely, the imprint information generating unit 5d generates imprint information Sd for an imprint Si to be affixed on a recording medium P, based on the image information (mark information) 3a obtained by the image obtaining unit 5a and the frame information Sf generated by the frame information generating unit 5e. Specifically, the imprint information generating unit 5d generates, for example, imprint information Sd by combining image information 3a for a user's desired mark image Sp with frame information Sf for a square frame W created so as to enclose the mark image Sp.

The display unit 6 is configured with, for example, a display such as an LCD (Liquid Crystal Display) or a CRT (Cathode Ray Tube), and displays various types of information on a display screen under the control of the display control unit 7.

The display control unit 7 performs control to generate display data and display the display data on a display screen of the display unit 6.

Specifically, the display control unit 7 includes, for example, a video card (not illustrated) having a GPU (Graphics Processing Unit), VRAM (Video Random Access Memory), etc. In response to a display instruction from the central control unit 1, the display control unit 7 generates, by a rendering process by the video card, display data for various types of screens for generating imprint information Sd in an imprint information generation process, and outputs the display data to the display unit 6.

The communication control unit 8 is configured with, for example, a modem or a terminal adapter, and performs communication control of information with a stamp creation apparatus 200 connected thereto through a predetermined communication network N.

Specifically, the communication control unit 8, for example, transmits imprint information Sd generated in an imprint information generation process, to the stamp creation apparatus 200 through the predetermined communication network N.

Here, the communication network N is, for example, a communication network that connects the image processing apparatus 100 to an external device (e.g., the stamp creation apparatus 200) through a wireless base station or a gateway server (not illustrated).

In addition, the communication network N is, for example, a communication network constructed using a dedicated line or an existing general public line, and various line modes such as a LAN (Local Area Network) and a WAN (Wide Area Network) can be applied. In addition, the communication network N includes, for example, various types of communication networks such as a telephone network, an ISDN network, a dedicated line, a mobile communication network, a communication satellite line, and a CATV network, and an Internet service provider that connects those networks.

The stamp creation apparatus 200 receives imprint information Sd transmitted from the communication control unit 8 of the image processing apparatus 100, and creates a stamp S according to the imprint information Sd.

Specifically, the stamp creation apparatus 200 creates a stamp S by, for example, performing engraving on a surface (imprinting surface) of a stamp material such as a synthetic resin, an animal horn, a tusk, or a wood such that an imprint Si corresponding to the imprint information Sd is mirror-reversed when affixed on a recording medium P.

Note that although the stamp creation apparatus 200 is exemplified as being connected to the image processing apparatus 100 through the predetermined communication network N so as to be able to perform information communication, the configuration is an example and thus is not limited thereto. The stamp creation apparatus 200 does not necessarily need to be connected so as to be able to perform information communication.

Namely, for example, the configuration may be such that imprint information Sd generated by the image processing apparatus 100 is stored in a predetermined memory card (not illustrated), and the memory card is sent through postal mail, etc., to a location where the stamp creation apparatus 200 is installed. Then, the stamp creation apparatus 200 reads the imprint information Sd stored in the memory card and creates a stamp S according to the imprint information Sd.

<Imprint Information Generation Process>

Next, an imprint information generation process by the image processing apparatus 100 will be described with reference to FIGS. 2 to 3A to 3D.

Figure 2:
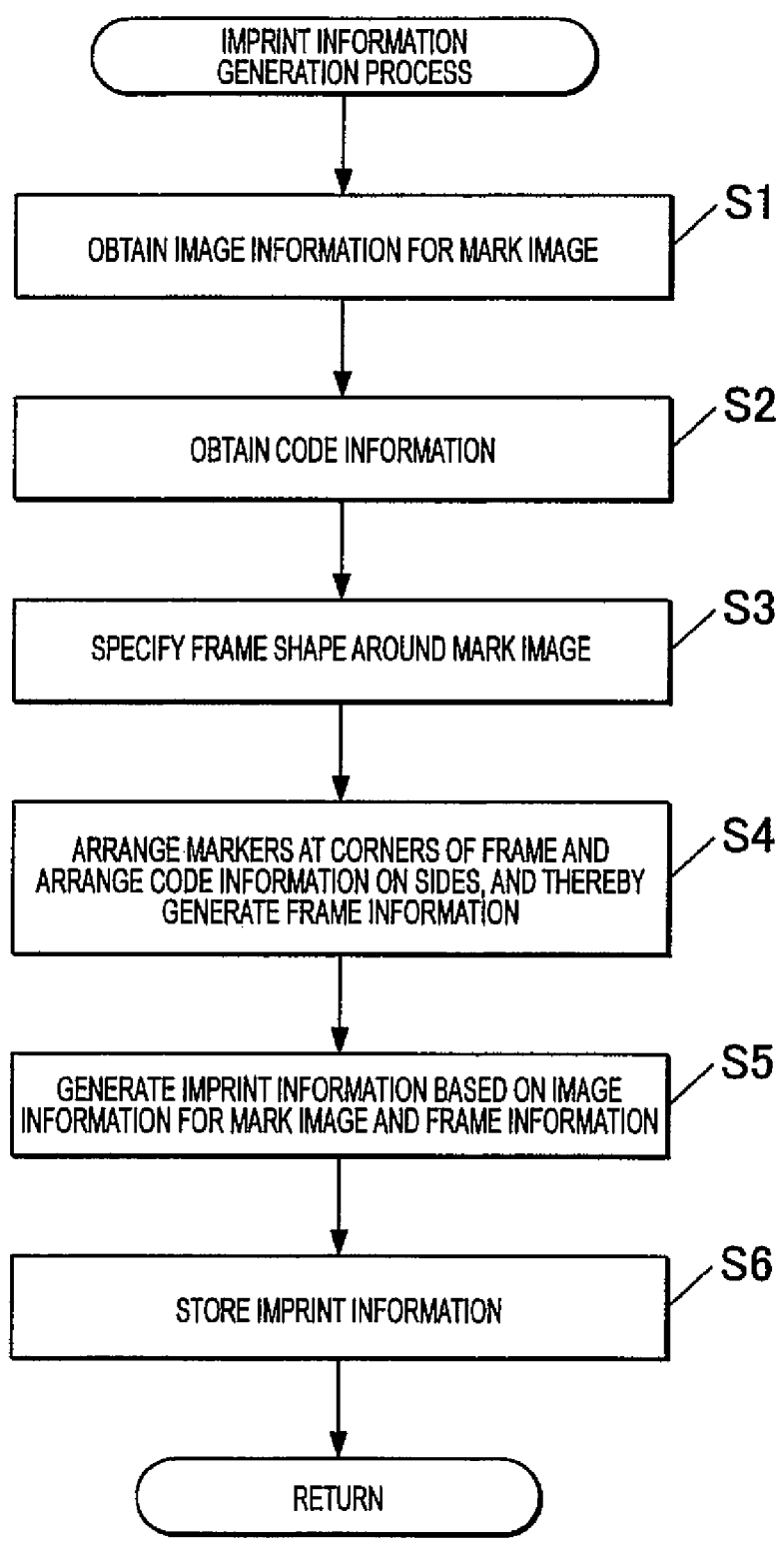
FIG. 2 is a flowchart illustrating an example of operation related to an imprint information generation process by the image processing apparatus of FIG. 1.

FIG. 2 is a flowchart illustrating an example of operation related to an imprint information generation process.

As illustrated in FIG. 2, first, the image obtaining unit 5a obtains image information 3a for a mark image Sp for forming an imprint Si of a stamp S (step S1). Specifically, for example, when the display control unit 7 allows the display unit 6 to display images for a predetermined number of pieces of image information 3a stored in the storage unit 3, and a user's desired image is specified based on a user's predetermined operation on the operation input unit 4, with the specified image serving as a mark image Sp, the image obtaining unit 5a obtains image information 3a for the mark image Sp (see FIG. 3A).

Then, the code obtaining unit 5b obtains code information Sc for forming the imprint Si of the stamp S (step S2). Specifically, for example, the code obtaining unit 5b encodes predetermined information (e.g., a URL) inputted based on a user's predetermined operation on the operation input unit 4, according to a predetermined coding format, and thereby creates a black and white binary encoded image, and obtains the encoded image as code information Sc.

Subsequently, when a frame shape (e.g., a square shape) around the mark image Sp is specified based on a user's predetermined operation on the operation input unit 4, the display control unit 7 allows the display unit 6 to display an image where a square frame W is added so as to enclose the mark image Sp for the user's desired image information 3a (step S3; see FIG. 3B).

Then, the frame information generating unit 5c adds markers M of a predetermined shape (e.g., a square shape) which are used to detect vertices, to four corners of the square frame W, respectively (see FIG. 3C), and adds pieces of code information Sc to four sides Ws, . . . , respectively, such that the pieces of code information Sc are point-symmetric to each other with respect to a center Wc of the frame W, and thereby generates frame information Sf (step S4; see FIG. 3D).

Note that frame information Sf according to the present invention does not necessarily need to be added with markers M at four corners of the square frame W.

Subsequently, the imprint information generating unit 5d generates imprint information Sd by combining the image information 3a for the user's desired mark image Sp obtained by the image obtaining unit 5a with the frame information Sf for the square frame W generated by the frame information generating unit 5c (step S5).

Then, the imprint information generating unit 5d outputs the generated imprint information Sd to the storage unit 3. The storage unit 3 stores the inputted imprint information Sd in a predetermined storage area (step S6), and the imprint information generation process ends.

Thereafter, at predetermined timing, the communication control unit 8 reads from the storage unit 3 the imprint information Sd generated by the imprint information generation process, and transmits the imprint information Sd to the stamp creation apparatus 200 through the predetermined communication network N.

When the stamp creation apparatus 200 receives the imprint information Sd, the stamp creation apparatus 200 creates a stamp S (see FIG. 4A), according to the received imprint information Sd.

<Method of Use of a Stamp>

A method of use of a stamp S will be described below.

A stamp S is, for example, affixed on a recording medium P such as paper, thereby forming an imprint Si on the recording medium P (see FIG. 4A).

Figure 4B:
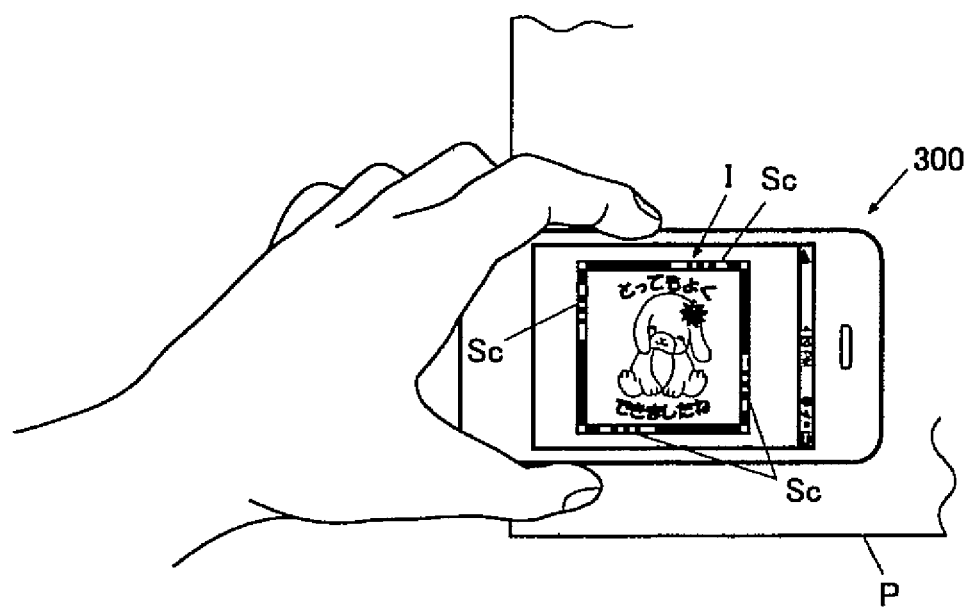

Then, for example, when the imprint Si on the recording medium P is captured by an imaging apparatus 300 such as a smartphone, the imaging apparatus 300 performs a decoding process appropriate to a predetermined encoding scheme, on image information of code information Sc included in a frame portion of an imprint image I, and thereby reads and obtains original predetermined information (e.g., a URL) represented by the code information Sc (see FIG. 4B).

Subsequently, the imaging apparatus 300 controls performance of processes for the obtained predetermined information. For example, the imaging apparatus 300 accesses a specific page on the Internet based on the obtained URL, and performs various types of processes set in advance (e.g., playback of specific audio and images).

As described above, according to the image processing apparatus 100 of the present embodiment, imprint information Sd for an imprint Si to be affixed on a recording medium P is generated based on image information (mark information) 3a for a mark image Sp and frame information Sf where code information Sc where predetermined information is encoded into a regular arrangement of a set of pixels is added to a frame W around the mark image Sp. Thus, the code information Sc can be added to the frame W around the mark image Sp in a relatively large size, and the code information Sc does not interfere with the mark image Sp combined therewith. Furthermore, even if the code information Sc is an encoded, mechanical image, since the code information Sc is added to the frame W around the mark image Sp, by combining the code information Sc with another mark image Sp, a stamp S with an excellent design can be created. Accordingly, even if an imprint Si of the created stamp S is affixed on a recording medium P, it is possible to make a viewer of the imprint Si less likely to feel a sense of oddness.

As such, without code information Sc interfering with another mark image Sp, the code information Sc and another mark image Sp can be appropriately combined together.

In addition, since frame information Sf is generated where pieces of code information Sc are added to at least two sides Ws, . . . , respectively, among a plurality of sides Ws, . . . with substantially equal lengths of a polygonal frame W, multiple pieces of code information Sc, . . . can be embedded in imprint information Sd. Thus, for example, the imaging apparatus 300 such as a smartphone can stably perform a reading process for reading original predetermined information from the code information Sc. In particular, in the case of an imprint Si of a stamp (rubber stamp) using a synthetic resin as a stamp material, since the imprint Si is likely to become blurred or faint, the accuracy of a reading process may be reduced. However, since multiple pieces of code information Sc, . . . are embedded in imprint information Sd, the imaging apparatus 300 can properly perform a reading process using these pieces of code information Sc, . . . . For example, a configuration is employed in which, when pieces of code information Se are added to four sides Ws, . . . of a square frame W, if the code information Sc is detected at two or more locations and original predetermined information is thereby read, then it is determined that the predetermined information has been able to be read properly. By this configuration, the original predetermined information can be stably read from the code information Sc.

In addition, since frame information Sf is such that at least two pieces of code information Sc, . . . are added to a frame W so as to be symmetric to each other with respect to a predetermined position, flexibility in direction for when an imprint Si of a stamp S created based on the frame information Sf is affixed on a recording medium P can be improved. For example, when pieces of identical code information Sc are added to four sides Ws, . . . of a square frame W, respectively, so as to be point-symmetric to each other with respect to a center Wc of the frame W, whichever direction of the frame W, i.e., whichever side Ws among the four sides Ws, . . . comes on the upper side when an imprint Si is affixed on a recording medium P, identical images corresponding to the code information Sc can be formed in a frame portion of the imprint Si. This enables to make a viewer of the imprint Si less likely to feel a sense of oddness.

Note that the present invention is not limited to the above-described embodiment, and various modifications and design changes may be made thereto without departing from the spirit and scope of the present invention.

Figure 5A:
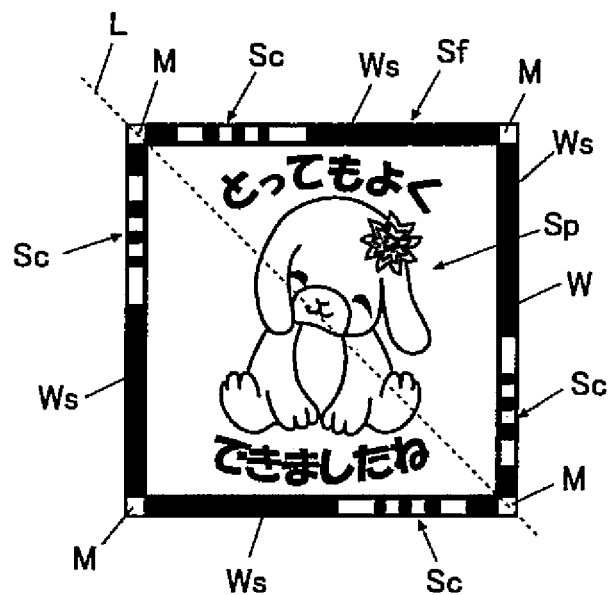
FIGS. 5A and 5B are diagrams schematically illustrating examples of imprint information generated by the image processing apparatus of FIG. 1.

For example, although the above-described embodiment exemplifies frame information Sf where pieces of code information Sc are added to four sides Ws, . . . of a square frame W so as to be point-symmetric to each other with respect to a center Wc of the frame W, it is an example and thus is not limited thereto. Addition of code information Sc can be arbitrarily changed where appropriate. For example, the frame information generating unit 5c may generate frame information Sf where pieces of identical code information Sc are added to four sides Ws, . . . of a square frame W, respectively, so as to be line-symmetric with respect to a diagonal line (predetermined line) L (see FIG. 5A).

Furthermore, different pieces of code information Sc may be added to a plurality of sides Ws, . . . of a polygonal frame. In this case, the amount of code information (original predetermined information) Sc embedded in imprint information Sd can be increased.

In addition, although in the above-described embodiment a square frame W is exemplified as a polygonal frame W, the shape is an example and thus is not limited thereto. The shape of the frame W can be arbitrarily changed where appropriate. For example, the frame W may have an equilateral triangular shape or an equilateral pentagonal shape.

Furthermore, the shape of the frame W is not limited to a polygonal shape and may be, for example, annular. Namely, as illustrated in FIG. 5B, a frame W may be formed in a substantially annular shape having a plurality of (e.g., four) arc portions Wa, . . . with substantially equal lengths, and frame information Sf may be generated where pieces of code information Sc are added to at least two arc portions Wa, respectively, among the plurality of arc portions Wa, . . . .

Figure 5B:
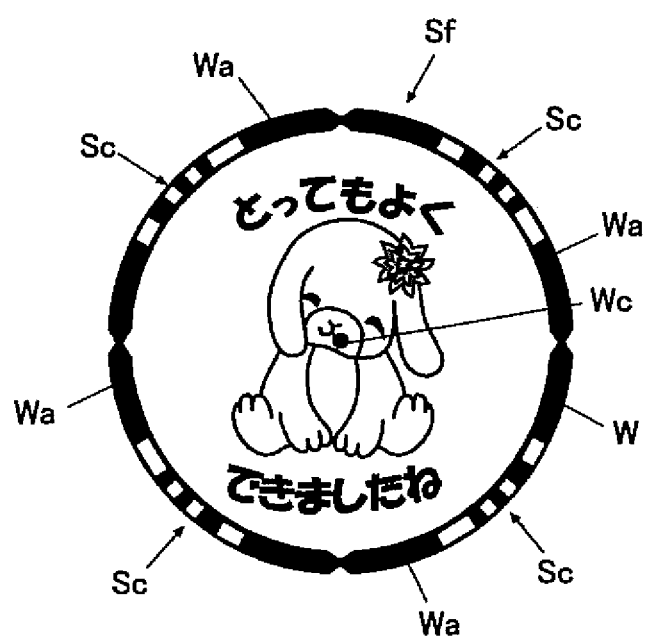

Note that in the case of the frame information Sf illustrated in FIG. 5B, the pieces of code information Sc are added to the four arc portions Wa, . . . of the substantially annular frame W, respectively, so as to be point-symmetric to each other with respect to a center Wc of the frame W; however, the addition of the code information Sc is an example and thus is not limited thereto, and can be arbitrarily changed where appropriate.

Even if the frame information Sf has such a frame shape, since, as in the above-described embodiment, multiple pieces of code information Sc are embedded in imprint information Sd, the imaging apparatus 300 can stably perform a reading process for reading original predetermined information from the code information Sc, using the plurality of pieces of code information Sc, . . . .

Note that different pieces of code information Sc may be added to the plurality of arc portions Wa. In this case, as in the above description, the amount of code information (original predetermined information) Sc embedded in imprint information Sd can be increased.

Note also that although in the above-described embodiment the imprint information generating unit 5d generates imprint information Sd, the imprint information generating unit 5d does not necessarily need to be provided. The configuration may be such that image information (mark information) 3a obtained by the image obtaining unit 5a and frame information Sf generated by the frame information generating unit 5c are stored in the storage unit 3, as information for generating imprint information Sd for an imprint Si to be affixed on a recording medium P. Namely, when creating a stamp S, the image information (mark information) 3a and the frame information Sf which are stored in the storage unit 3 are read and transmitted to the stamp creation apparatus 200. Then, the stamp creation apparatus 200 generates imprint information Sd based on the received image information (mark information) 3a and frame information Sf, and creates a stamp S (see FIG. 4A) according to the generated imprint information Sd.

Even by such a configuration, as in the above-described embodiment, without code information Sc interfering with another mark image Sp, the code information Sc and another mark image Sp can be appropriately combined together.

In addition, although in the above-described embodiment the configuration is such that the functions of a first obtaining unit, a second obtaining unit, a frame image creating unit, and an imprint information generating unit are implemented by the image obtaining unit 5a, the code obtaining unit 5b, the frame information generating unit 5c, and the imprint information generating unit Sd driving under the control of the central control unit 1 of the image processing apparatus 100, the configuration is not limited thereto. The configuration may be such that the functions are implemented by the CPU of the central control unit 1 executing a predetermined program, etc.

Namely, a program including a first obtaining process routine, a second obtaining process routine, a first generation process routine, and a second generation process routine is stored in a program memory that stores programs. Then, by the first obtaining process routine, the CPU of the central control unit 1 may be allowed to function as a unit that obtains mark information for a mark image Sp for forming an imprint Si. In addition, by the second obtaining process routine, the CPU of the central control unit 1 may be allowed to function as a unit that obtains code information Sc where predetermined information is encoded into a regular arrangement of a set of pixels. In addition, by the first generation process routine, the CPU of the central control unit 1 may be allowed to function as a unit that generates frame information Sf by adding the obtained code information Sc to a frame W around the mark image Sp. In addition, by the second generation process routine, the CPU of the central control unit 1 may be allowed to function as a unit that generates imprint information Sd for the imprint Si to be affixed on a recording medium P, based on the obtained mark information and the generated frame information Sf.

Furthermore, as a computer-readable medium storing a program for performing the above-described processes, in addition to ROM, a hard disk, etc., portable recording media such as nonvolatile memory, e.g., flash memory, and a CD-ROM can also be applied. In addition, as a medium that provides program data through a predetermined communication line, a carrier wave is also applied.

What is claimed is:

1. A stamp for forming an imprint on a recording medium, comprising:
    an image area containing an image corresponding to the imprint formed by the stamp;
    a frame surrounding said image area, said frame having a plurality of sections, said frame having code information constituting a complete code;
    wherein each of at least two of said plurality of sections has identical code information of said code constituting said complete code.

2. The stamp of claim 1, wherein the code is stored in at least two of said plurality of sections so as to be symmetric with respect to a predetermined portion.

3. The stamp of claim 2, wherein the symmetry is point symmetric with respect to a center of the frame.

4. The stamp of claim 2, wherein the symmetry is line symmetric with respect to a line through the frame.

5. The stamp of claim 1, wherein the shape of the frame is a polygon, and said sections are sides of the polygon.

6. The stamp of claim 1, wherein the shape of the frame is a circle, and said sections are arcs of the circle.

7. The stamp of claim 1, wherein the code includes at least one of a URL for accessing a predetermined server, various types of images, and a predetermined character string.

8. A stamp creation apparatus for forming a stamp imprinted on a recording medium, comprising:
    an image area generating unit configured to create an image area corresponding to the stamp;
    a frame generating unit configured to generate a frame surrounding said image area, the frame having a plurality of sections said frame having code information constituting a complete code;
    wherein each of at least two of said plurality of sections has identical code information of said code constituting said complete code.

9. A stamp creation method for forming a stamp imprinted on a recording medium, comprising:
    creating, by an image area generating unit, an image area corresponding to the stamp;
    generating, by a frame generating unit, a frame surrounding said image area, the frame having a plurality of sections, said frame having code information constituting a complete code;
    wherein each of at least two of said plurality of sections has identical code information of said code constituting said complete code.

10. A non-transitory computer-readable medium recording a program that causes a computer included in a stamp creation apparatus for forming a stamp imprinted on a recording medium to perform the following steps:
    creating, by an image area generating unit, an image area corresponding to the stamp;
    generating, by a frame generating unit, a frame surrounding said image area, the frame having a plurality of sections, said frame having code information constituting a complete code;
    wherein each of at least two of said plurality of sections has identical code information of said code constituting said complete code.

11. The stamp of claim 1, wherein each of the at least two of said plurality of sections that have identical code information constituting said complete code is adapted to be read by a reading apparatus such that the reading apparatus can extract predetermined information from said complete code.

12. The stamp creation apparatus of claim 8, wherein each of the at least two of said plurality of sections that have identical code information constituting said complete code is adapted to be read by a reading apparatus such that the reading apparatus can extract predetermined information from said complete code.

13. The stamp creation method of claim 9, wherein each of the at least two of said plurality of sections that have identical code information constituting said complete code is adapted to be read by a reading apparatus such that the reading apparatus can extract predetermined information from said complete code.

14. The non-transitory computer-readable medium of claim 10, wherein each of the at least two of said plurality of sections that have identical code information constituting said complete code is adapted to be read by a reading apparatus such that the reading apparatus can extract predetermined information from said complete code.

* * * * *